United States Patent
Tulsi et al.

(10) Patent No.: US 9,654,814 B2
(45) Date of Patent: May 16, 2017

(54) VIDEO FRAME SELECTION FOR TARGETED CONTENT

(71) Applicant: MICROSOFT CORPORATION, Redmond, WA (US)

(72) Inventors: Japjit S. Tulsi, Redmond, WA (US); Prabhakar Goyal, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 60 days.

(21) Appl. No.: 14/064,876

(22) Filed: Oct. 28, 2013

(65) Prior Publication Data

US 2015/0121421 A1    Apr. 30, 2015

(51) Int. Cl.

| | | |
|---|---|---|
| H04N 21/80 | (2011.01) | |
| H04N 21/2668 | (2011.01) | |
| H04N 21/2389 | (2011.01) | |
| H04N 21/81 | (2011.01) | |
| H04N 21/234 | (2011.01) | |
| H04N 21/44 | (2011.01) | |
| H04N 21/458 | (2011.01) | |
| H04N 21/8358 | (2011.01) | |

(52) U.S. Cl.
CPC ... *H04N 21/2668* (2013.01); *H04N 21/23418* (2013.01); *H04N 21/23892* (2013.01); *H04N 21/44008* (2013.01); *H04N 21/44016* (2013.01); *H04N 21/458* (2013.01); *H04N 21/812* (2013.01); *H04N 21/814* (2013.01); *H04N 21/8358* (2013.01)

(58) Field of Classification Search
None
See application file for complete search history.

(56) References Cited

U.S. PATENT DOCUMENTS

| | | | |
|---|---|---|---|
| 7,631,330 B1 | 12/2009 | Des Jardins | |
| 8,209,223 B2 | 6/2012 | Fink et al. | |
| 2003/0028873 A1* | 2/2003 | Lemmons | H04N 7/17318 725/36 |
| 2008/0263583 A1 | 10/2008 | Heath | |
| 2009/0006191 A1* | 1/2009 | Arankalle | G06Q 30/02 705/14.71 |
| 2009/0213270 A1 | 8/2009 | Ismert et al. | |

(Continued)

FOREIGN PATENT DOCUMENTS

WO    2009100093 A1    8/2009

OTHER PUBLICATIONS

"International Search Report and Written Opinion Issued in PCT Patent Application No. PCT/US2014/061661", Mailed Date: Jan. 5, 2015, 11 Pages.

(Continued)

*Primary Examiner* — Cai Chen
(74) *Attorney, Agent, or Firm* — Shook, Hardy & Bacon L.L.P.

(57) ABSTRACT

Systems, methods, and computer-readable storage media are provided for providing target content, such as advertisements, based on one or more selected video frames. A set of video frames and target content is received. The target content is to be presented upon detection of a playback of the set of video frames. The playback of the set of video frames is detected. In response to the detection of the playback of the set of video frames, the target content is communicated for presentation.

18 Claims, 5 Drawing Sheets

(56) References Cited

U.S. PATENT DOCUMENTS

2010/0030642 A1   2/2010  Huffman et al.
2010/0131847 A1   5/2010  Sievert et al.
2011/0078623 A1   3/2011  Liu et al.
2012/0136701 A1   5/2012  Relan et al.
2013/0205315 A1   8/2013  Sinha et al.

OTHER PUBLICATIONS

Guo, et al., "AdOn: An Intelligent Overlay Video Advertising System", In Proceedings of the 32nd International ACM SIGIR Conference on Research and Development in Information Retrieval, Jul. 19, 2009, 2 pages.
Srinivasan, et al., "vADeo—Video Advertising System", In Proceedings of the 15th International Conference on Multimedia, Sep. 24, 2007, 2 pages.
"Second Written Opinion Issued in PCT Application No. PCT/US2014/061661", Mailed Date: Oct. 2, 2015, 5 Pages.
"International Preliminary Report on Patentability Issued in PCT Application No. PCT/US2014/061661", Mailed Date: Feb. 5, 2016, 6 Pages.

* cited by examiner

VIDEO FRAME SELECTION FOR TARGETED CONTENT

BACKGROUND

Targeted advertising has recently grown such that advertisements are provided based on a user's online search sessions, images viewed by the user, contents of e-mails, etc. Advertisements that are targeted to users based on video content, however, have traditionally been selected based on a type of web page where the video content appears (e.g., news page, entertainment page), based on the genre to which the video content belongs, or even based on a time marker in a video stream in which an advertiser believes an advertisement would be relevant. However, a time marker is ineffective when a video is montaged, divided up into various segments, etc. While object recognition within video content has also been used to target advertisements, object recognition is computationally heavy and time intensive.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In various embodiments, systems, methods, and computer-readable storage media are provided for targeting target content based on a playback of a set of video frames in video content. For instance, target content providers are able to upload a sequence of video frames (e.g., a segment of a video) that they are interested in targeting. Target content related to the sequence of video frames is also provided by the target content provided. When a user is watching a video, the targeted video segment can be detected such that target content can be triggered. The target content may then be communicated for presentation to the user's computing device, and can be presented as an overlay to the video, inserted in the video stream, displayed on a secondary computing device, or the like. The same video segment can be sold on a reserved basis or to multiple advertisers with different bids. In some instances, multiple advertisers may be interested in the same segment such that the highest bidder is able to provide its advertisement based on the targeted video segment. Embodiments of the present invention allow for precise video content targeting irrespective of when playback of the targeted video segment occurs within video content. As such, the playback of specific frames is detected, and thus pre-processing of all possible video content is not required.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for providing target content. Target content, as used herein, may refer to advertisements, organic information, promotional content, or any other type of information that is desired to be directed to a user. The target content may be provided by, for example, a target content provider, such as an advertising provider, an informational provider, etc. Targeted advertising of video content may be computationally difficult if object recognition is the method used. However, utilizing embodiments of the present invention, object recognition is not necessary. Instead, a target content provider can select a set of video frames that it would like to target with particular target content. The set of video frames can be detected in video content being presented to a user on a computing device. Once detected, the target content can then be communicated for presentation to the computing device. Target content may be presented as in-line video target content (e.g., 15-, 30-, or 45-second video target content), an overlay on the video content being viewed by a user, or a target content experience on a secondary companion device. For instance, if a user is associated with a laptop and a gaming machine, while the user is watching video content on the laptop, the target content could be presented on a display device associated with the gaming machine.

Additionally, instead of a target content provider specifying a time in video content, such as in a video clip, when target content is to be presented or displayed, here, a specific set of video frames is selected by the target content provider such that irrespective of when the selected set of video frames occurs in any type of video content, the presentation of the target content can be triggered. For instance, a set of video frames may show up in different contexts, such as in a news video, a montage of multiple videos, a video presented as a search result based on an entered search query, etc. If the trigger for presenting the target content is based on time, the target content will not be related to the portion of the video currently being viewed by a user in many instances. But by triggering the presentation of the target content based on the selected set of video frames being presented, the target content is more likely to be targeted and valuable to the user.

Accordingly, one embodiment of the present invention is directed to one or more computer storage media storing computer-useable instructions that, when used by one or more computing devices, cause the one or more computing devices to perform a method for providing target content based on one or more selected video frames. The method includes receiving a selection of a set of video frames, receiving target content to be presented upon detection of a playback of the set of video frames, and detecting the playback of the set of video frames. The method further includes, in response to detecting the playback of the set of video frames, communicating for presentation the target content.

In another embodiment, a method being performed by one or more computing devices having at least one processor is provided, the method for providing target content based on video frames. The method includes monitoring video content that is displayed on a computing device associated with a user and determining that a set of video frames within the video content is targeted by a third-party advertisement provider in relation to one or more advertisements. Further, the method includes retrieving from storage the one or more advertisements associated with the set of video frames and communicating for presentation the one or more advertisements that are to be presented to the user based on playback of the set of video frames.

In yet another embodiment, a system is provided. The system includes one or more processors and one or more computer storage media storing a plurality of software components. The software components include an intake component configured to receive from a third party target content provider a selection of a set of video frames and target content to be presented to a user based on a playback of the set of video frames. The software components also include a monitoring component configured to monitor video content being presented to the user to determine that the set of video frames is included in the video content, and a target content module to determine that the video content comprises the set of video frames and to communicate for presentation the target content associated with the set of video frames.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

Figure 1:
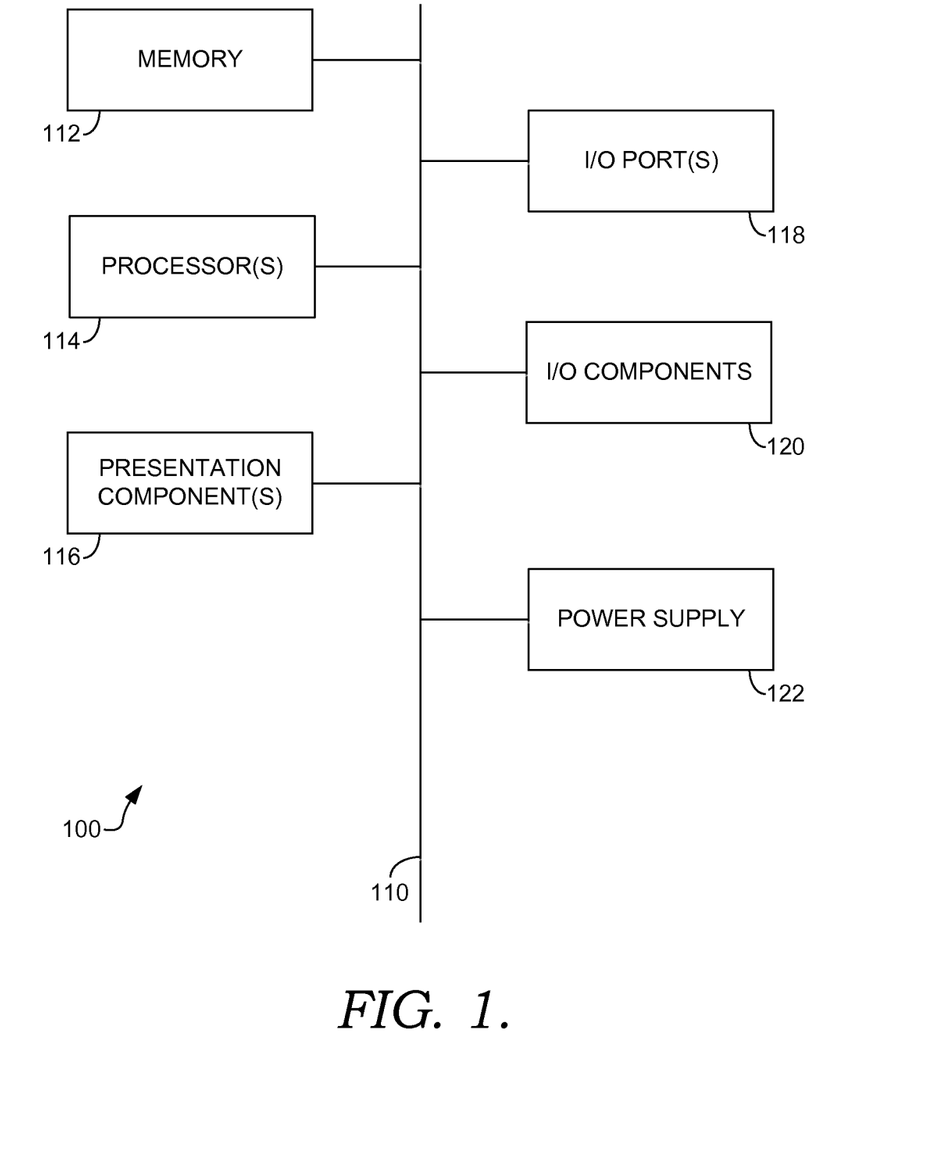
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, one or more I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative I/O components include a microphone, joystick, game pad, satellite dish, scanner, printer, wireless device, a controller, such as a stylus, a keyboard and a mouse, a natural user interface (NUI), and the like. An NUI processes air gestures, voice, or other physiological inputs generated by a user. These inputs may be interpreted as search requests, words or symbols appearing in apps available for retrieval in response to input search requests, and the like presented by the computing device 100. These requests may be transmitted to the appropriate network element for further processing.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices. The computer-useable instructions form an interface to allow a computer to react according to a source of input. The instructions cooperate with other code segments to initiate a variety of tasks in response to data received in conjunction with the source of the received data.

Figure 2:
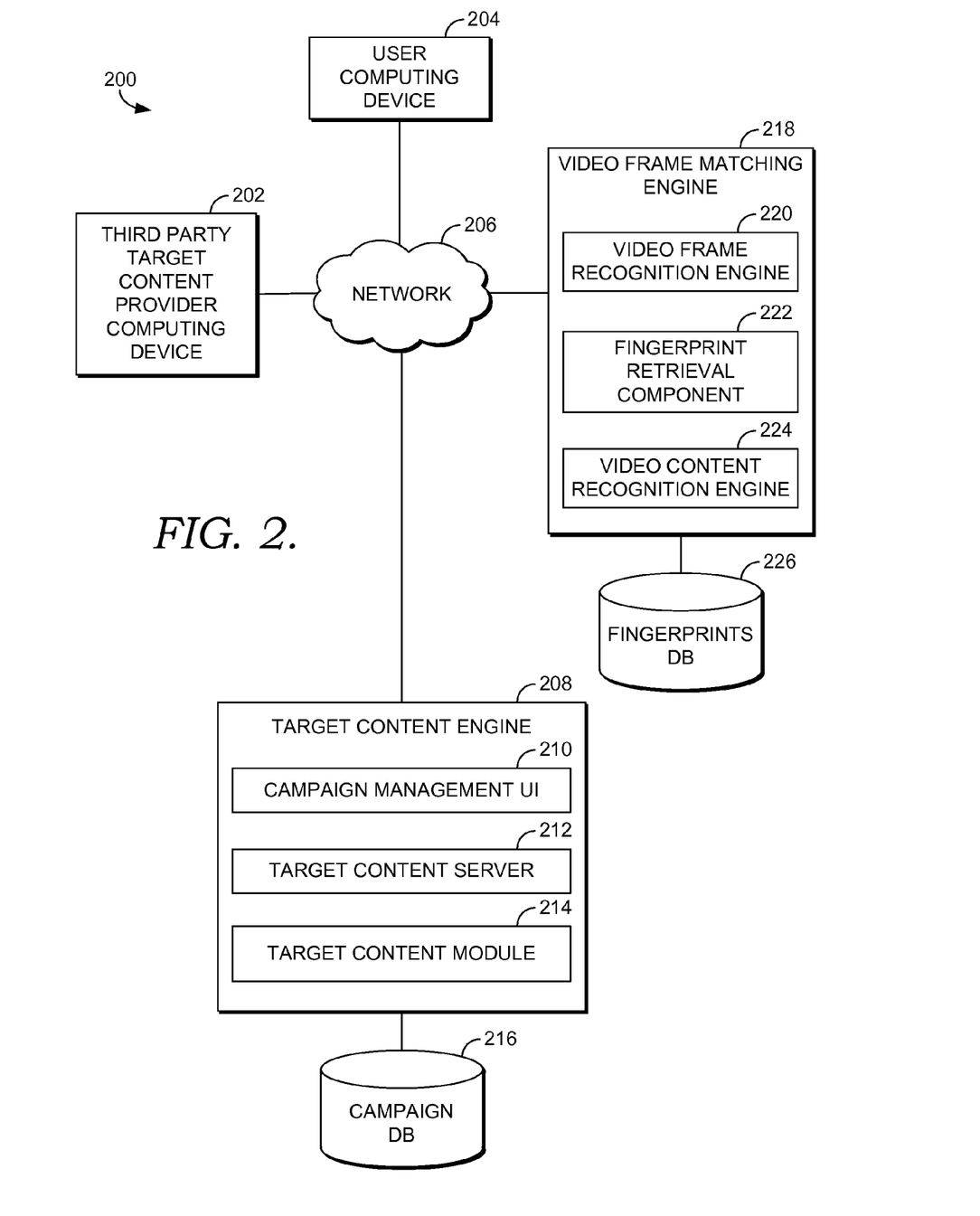
FIG. 2 is a block diagram of an exemplary computing system in which embodiments of the invention may be employed.

As previously set forth, embodiments of the present invention provide systems, methods, and computer-readable storage media for providing target content, such as advertisements, other promotional content, organic information, or other information that is to be directed to a user based on a selected set of video frames. With reference to FIG. 2, a block diagram is provided illustrating an exemplary computing system 200 in which embodiments of the present invention may be employed. Generally, the computing system 200 illustrates an environment in which a third-party target content provider computing device 202 (also termed content provider computing device 202) may select a set of video frames to target, and when a user views the set of video frames, target content provided by the content provider is communicated for presentation to the user. As such, targeted or directed target content is provided to a user based on the detection of a set of frames in video content being presented to the user. Among other components not shown, the computing system 200 generally includes a third-party target content provider computing device 202, a user computing device 204, a target content engine 208, and a video frame matching engine 218, all in communication with one another via a network 206. The network 206 may include, without limitation, one or more local area networks (LANs) and/or wide area networks (WANs). Such networking environments are commonplace in offices, enterprise-wide computer networks, intranets and the Internet. Accordingly, the network 206 is not further described herein.

It should be understood that any number of content provider computing devices 202, target content engines 208, and video frame matching engines 218 may be employed in the computing system 200 within the scope of embodiments of the present invention. Each may comprise a single device/interface or multiple devices/interfaces cooperating in a distributed environment. For instance, the target content engine 208 may comprise multiple devices and/or modules arranged in a distributed environment that collectively provide the functionality of the target content engine 208 described herein. Additionally, other components or modules not shown also may be included within the computing system 200.

In some embodiments, one or more of the illustrated components/modules may be implemented as stand-alone applications. In other embodiments, one or more of the illustrated components/modules may be implemented via the user computing device 204, the target content engine 208, the video frame matching engine 218, or as an Internet-based service. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of target content engines, video frame matching engines, and/or user computing devices.

It should be understood that this and other arrangements described herein are set forth only as examples. Other arrangements and elements (e.g., machines, interfaces, functions, orders, and groupings of functions, etc.) can be used in addition to or instead of those shown and/or described, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The user computing device 204 may include any type of computing device, such as the computing device 100 described with reference to FIG. 1, for example. Generally, the user computing device 204 includes a browser and a display. The browser, among other things, is configured to display or stream video content in association with the display of the user computing device 204. The browser further is configured to receive data in the form of target content from the network 206, and in particular, target content that has been provided by a third-party target content provider based on a targeted set of video frames. It should be noted that the functionality described herein as being performed by the browser may be performed by any other application, application software, user interface, or the like capable of rendering Web content. It should further be noted that embodiments of the present invention are equally applicable to mobile computing devices and devices accepting gesture, touch and/or voice input. Any and all such variations, and any combination thereof, are contemplated to be within the scope of embodiments of the present invention.

The third-party target content provider computing device 202 may be an advertiser, a marketer, an organic information provider, etc. As mentioned, target content, as used herein, refers to any type of information that can be presented to a user on a user's computing device. In one embodiment, target content is an advertisement, but in another embodiment, it is merely information that an entity would like to share. Utilizing embodiments of the present invention, the content provider computing device 202 is able to access a user interface (UI) and provide a set of video frames that the content provider would like to target. Instead of inputting a time in a particular video content at which target content is to be presented, the content provider actually is able to upload a set of video frames of interest. In addition to the set of video frames, the content provider uploads target content that is to be presented to the user once the targeted set of video frames is detected as being displayed on the user computing device 204. The content provider may also provide other information through the UI, such as bid information for the target content.

The target content engine 208 includes various components that are utilized to receive and store video frames, target content, and other information submitted by the content provider. These components include a campaign management UI 210, a target content server 212, and a target content module 214. The campaign management UI 210, also termed an intake component, is provided for target content providers to perform various tasks, including defining advertising campaign goals, uploading video frames, such as a short video clip to target with target content, etc. The target content server 212 receives campaign data from a campaign database 216, which receives campaign information from the campaign management UI 210. The target content server 212 also provides stored target content to other components when a targeted set of video frames is detected so that the target content can be provided to the user's computing device. The target content module 214 communicates target content to the user's computing device when a match occurs between a fingerprint associated with the targeted set of video frames and video content being viewed by the user. The target content engine 208 is coupled to the campaign database 216 that stores campaign data, including data provided by the target content provider such as bidding information, target content, fingerprints associated with targeted sets of video frames, etc.

In embodiments, the target content provider is an advertisement provider. In this embodiment, the advertisement provider may create an advertising campaign having an associate budget, and may associate a bid or accept existing pricing for providing its advertisements. A segment of a video that the advertisement provider wants to target is uploaded into the campaign management UI, as described below. A system component, such as the video frame recognition engine 220, fingerprints the video segment and associates the fingerprint of the video segment to the campaign. The target content is then created and uploaded to the system. The campaign information is pushed to the target content engine 208, including the associate budget and pricing, target content, and the fingerprint information of the video segment.

The video frame matching engine 218 includes various components that are utilized to process video frames and to monitor video content being displayed to a user on the user's computing device. These components include the video frame recognition engine 220, a fingerprint retrieval component 222, and a video content recognition engine 224. The video frame recognition engine 220 receives target video frames or video segments from the campaign management UI 210 and creates a fingerprint for each set of video frames that a content provider wants to target. As described herein, a fingerprint is a signature that uniquely identifies the set of video frames. Because video segments can be large in size and can be difficult to store, the fingerprint provides for a smaller version of the video segment, and can be easier to store than the entire video segment. The fingerprint retrieval component 222, in one embodiment, acts as a server, and retrieves fingerprints stored in the fingerprints database 226.

The video content recognition engine 224, also termed a monitoring component, monitors video content that is being processed through and being displayed on the user's computing device. The video content recognition engine 224 creates a fingerprint for the video frames running through the user's computing device to determine whether a match exists. In one embodiment, the video content recognition engine 224 comprises a fingerprint cache such that the fingerprints associated with the targeted sets of video frames are stored locally. However, in an alternative embodiment, the fingerprints are only stored in the fingerprints database 226 such that fingerprints are queried through the fingerprint retrieval component 222, which retrieves fingerprints from the fingerprints database 226. In yet another embodiment, a combination of local storage and storage in the fingerprints database 226 is utilized. The video frame matching engine 218 is coupled to a fingerprints database 226 that stores fingerprints generated by the video frame recognition engine 220.

For exemplary purposes only, technology that is able to detect the playback of video frames is used and integrated into the path of video playback. This may be done on the client side, such as on the device where the video content is playing, or may be integrated into backend video management or delivery service. The technology manages a cache of target video segment fingerprints, which it can look up when there is a match. The video playback is then processed by generating fingerprints of what is currently being played. Matches of fingerprints can then be detected. If a match is found, the corresponding target content is retrieved and provided for presentation on the user's computing device.

A system component, such as the target content server 212, returns the target content that corresponds to the target video segment. More than one target content provider may target the same video segment. In this case, the target content server 212 may select the target content that best matches the video segment based on yield and user experience optimization logic within the server. The target content returned may be displayed in a variety of ways. For example, the target content may be inserted within the content stream before, during, or after the target video segment. Alternatively, the target content may be displayed as an overlay on top of the video in which the target video segment was detected. Even further, the target content may be displayed on a second companion device that the user may be using. Impressions and interactions with the target content may be recorded. The target content provider may be billed based on the pricing associated with the campaign. The target content may be in the form of a video, an image, a web page link, an icon, etc.

Figure 3:
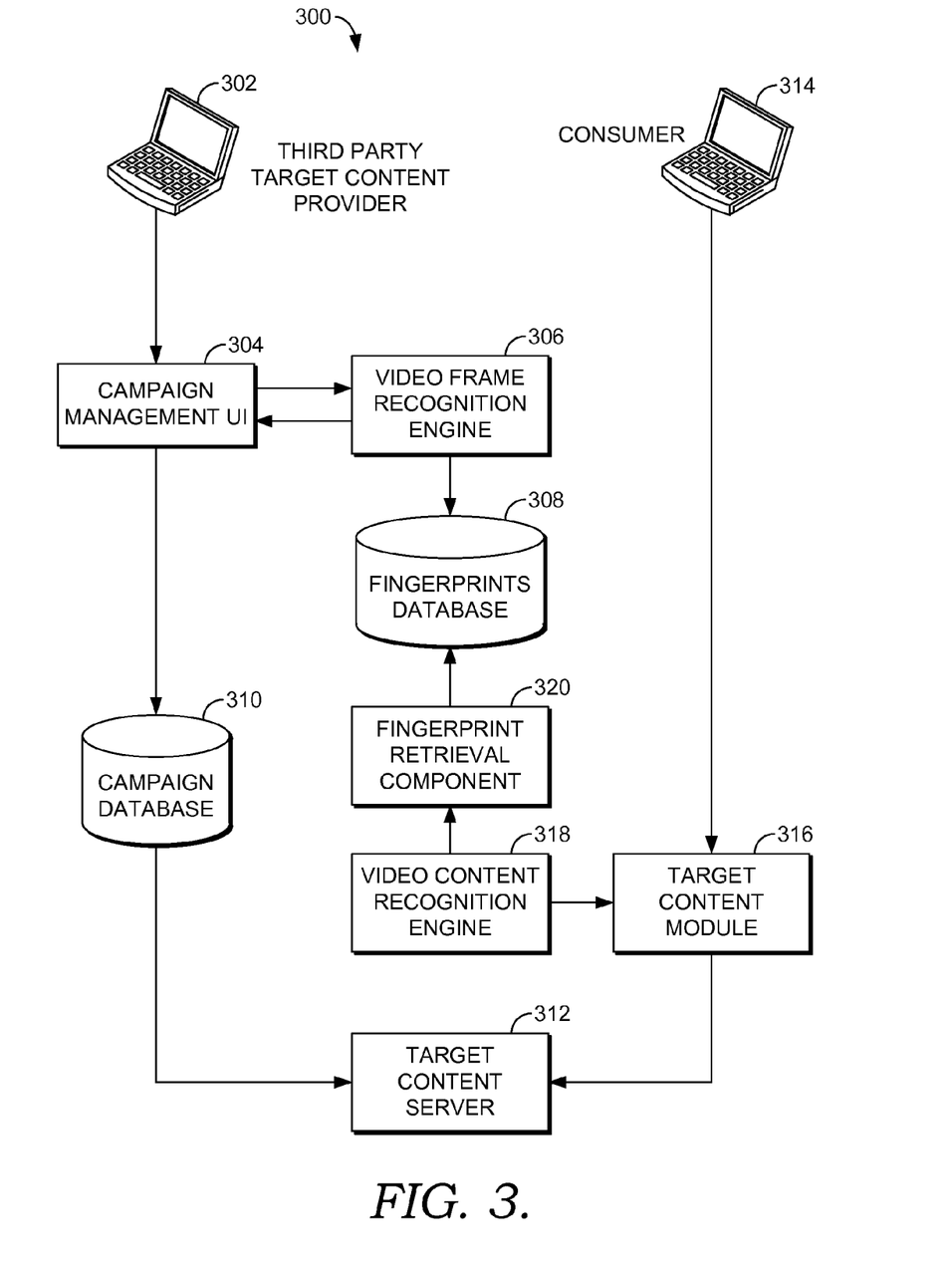
FIG. 3 is a block diagram of various exemplary components used to provide target content based on selected video frames, in accordance with an embodiment of the present invention.

Turning now to FIG. 3, a block diagram is provided of various exemplary components used to provide target content based on selected video frames, in accordance with an embodiment of the present invention. The diagram of FIG. 3 is generally referred to by numeral 300, and includes multiple components that are utilized to provide target content to a user's computing device based on video content being processed by the computing device. Initially, a third-party target content provider 302 submits a set of video frames and other information to a campaign management UI 304. The submitted set of video frames is a video clip of interest to the content provider 302, such as a video clip that the content provider 302 would like to target in an advertising campaign. Monetary bidding information and target content may also be provided by the content provider through the campaign management UI 304. Once the set of video frames to target is received, it is sent to the video frame recognition engine 306, which creates a fingerprint of the set of video frames. A fingerprint uniquely identifies a set of video frames in a way that doesn't require storage of the video frames themselves. Once the fingerprint is created, it is sent back to the campaign management UI 304 and eventually sent to the campaign database 310 for storage, along with other campaign data submitted by the content provider, including target content. Additionally, the fingerprint may be sent to the fingerprints database for future retrieval to determine if a user is viewing the set of video frames represented by the fingerprint. The campaign data is then sent to the target content server 312, which retrieves advertisements when a match is detected between a targeted set of frames and video content being viewed by a user.

The consumer 314 may be viewing video content on a computing device. This video content is, in one embodiment, being continuously monitored by a video content recognition engine 318, which creates fingerprints of the video content as it is playing on the computing device. These fingerprints are then compared to the fingerprints in the fingerprints database 308 of the targeted sets of video frames. The fingerprint retrieval component 320 retrieves stored fingerprints of the targeted sets of video frames. Once a match is detected, the target content module 316 retrieves the target content associated with the set of video frames from the target content server 312 and communicates the target content to the user's computing device for presentation. In one embodiment, the video content recognition engine 318 comprises a fingerprint cache for temporarily storing fingerprints of sets of video frames that are being targeted by a content provider.

Figure 4:
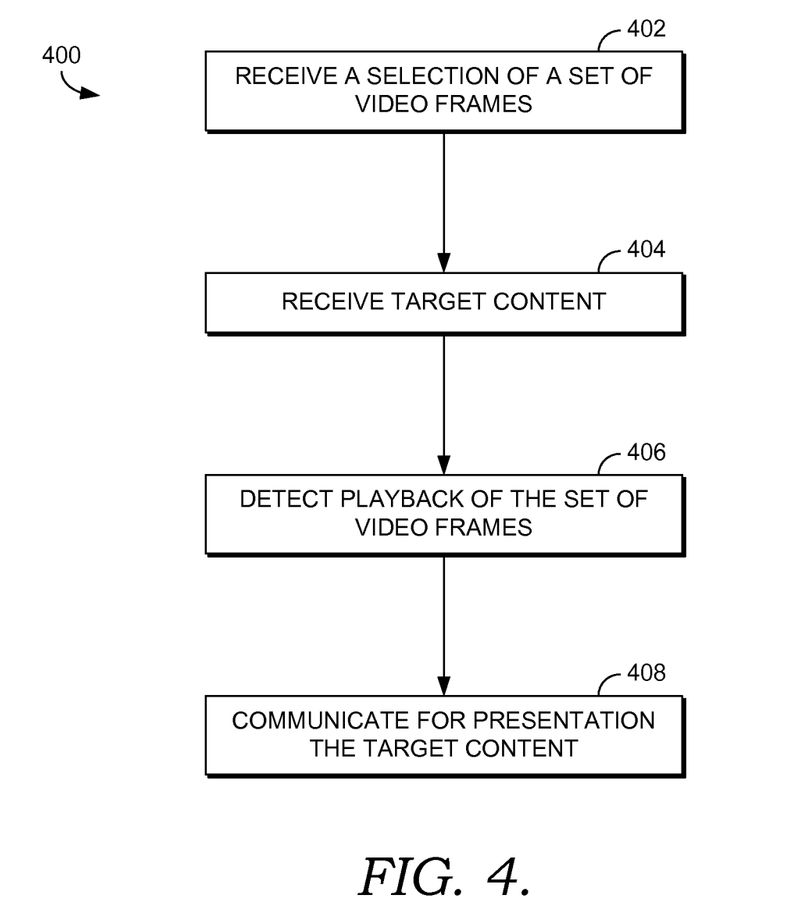
FIG. 4 is a flow diagram showing an exemplary method for providing target content based on selected video frames, in accordance with an embodiment of the present invention.

FIG. 4 illustrates a method 400 for providing target content based on one or more selected video frames. Initially at step 402, a selection of a set of video frames is received. Target content is received at step 404. In one embodiment, the selected set of video frames is stored in association with the received target content. The target content is to be presented upon detection of a playback of the set of video frames. In embodiments, the target content is related or relevant to the set of video frames that the content provider wants to target. As such, if the set of video frames is related to a particular ingredient used in a cooking show, the content provider may want the user to view target content related to that particular ingredient, such as an advertisement for that ingredient. At step 406, playback of the set of video frames is detected. The detection may be made by monitoring video content that comprises the targeted set of frames. In some instances, the monitoring is continuous. The target content is communicated for presentation in response to detecting the playback of the set of video frames. In one embodiment, the video content is displayed on the same computing device as that which displays the playback of the set of video frames.

In a further embodiment, the detection of the playback of the set of video frames comprises generating a fingerprint of the set of video frames, the fingerprint uniquely identifying the set of video frames. Further, the fingerprint of the set of video frames is stored for future reference to determine that the playback of the set of video frames matches the selected set of video frames. The one or more fingerprints are generated of the video content. Playback of the set of video frames that is targeted is detected by determining that the fingerprint of the set of video frames matches one of the one or more fingerprints of the video content.

Target content may be displayed in any of a number of ways. For exemplary purposes only and not for limitation, target content may be inserted within the video content stream before, during, or after the target video segment. Alternatively, target content may be an overlay on top of the video in which the target video segment was detected. Even further, the target content may be displayed in a second companion device that the user may be using. For example, if the user is watching the video content on a gaming machine while also using a computing device, the target content may be played on the computing device while the video experience on the gaming machine continues uninterrupted. In an embodiment, the target content impression is recorded, as well as any interactions the user has with the target content. The target content provider may be billed based on the pricing associated with the campaign. Target content, in one embodiment, is an advertisement that is provided by a third-party advertisement provider. Regardless of the type of target content being provided, in embodiments, the set of video frames to be targeted and the corresponding target content are both submitted by the third-party target content provider by way of a UI, as previously described.

Figure 5:
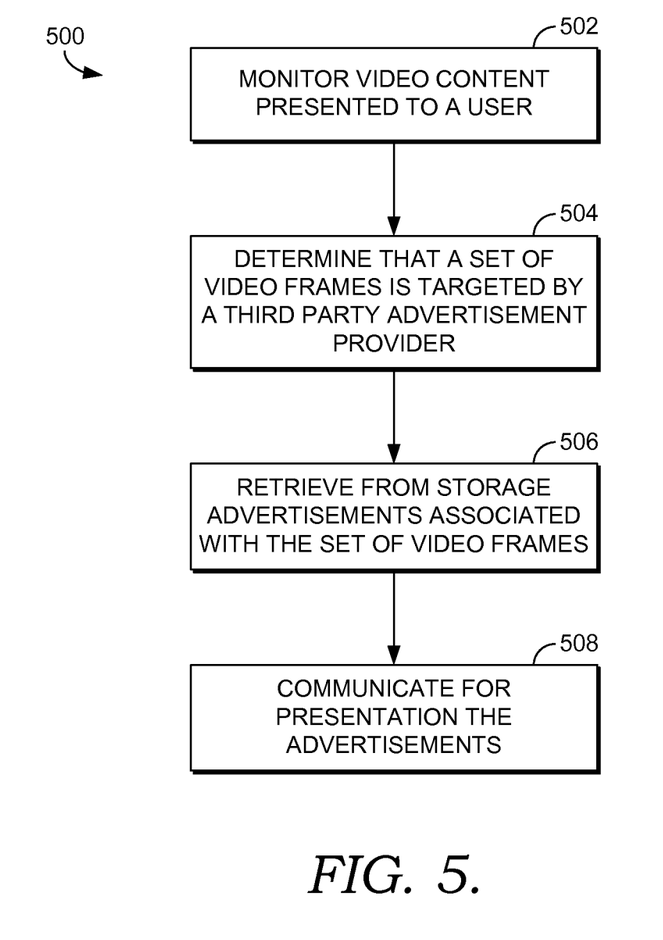
FIG. 5 is a flow diagram showing another exemplary method for providing target content based on video frames, in accordance with an embodiment of the present invention.

FIG. 5 illustrates a method 500 for providing target content based on video frames. Initially at step 502, video content presented to a user is monitored. The video content is displayed on a computing device associated with the user. In one embodiment, the computing device is a computer, laptop, or a tablet, but in other embodiments, the computing device is a gaming machine. At step 504, it is determined that a set of video frames is targeted by a third-party advertisement provider. The set of video frames is found within the video content being played on the user's computing device. The one or more advertisements associated with the set of video frames are retrieved from storage at step 506. At step 508, the one or more advertisements to be presented to the user based on playback of the set of video frames are communicated for presentation. In one embodiment, the advertisements are communicated to the computing device associated with the display of the video content, but in another embodiment, the advertisements are communicated to a secondary computing device associated with the user.

As mentioned herein, the monitoring of the video content to find targeted video frames is not based on a timing of the playback of the video frames within the video content. For instance, the content provider does not provide a time in a video that the advertisements are to be displayed to the user. Instead, the content provider provides the actual set of video frames that are to be targeted. The set of video frames could be played back at different times, as the set of video frames could be found in different video content, such as a video montage, a news feed, a video playback website, etc. As such, the set of video frames that is targeted by the content provider is not based on a timing of the playback of the set of video frames within the video content. In this way, the targeted set of video frames within the video content is determined as being targeted irrespective of when in the video content the playback of the targeted set of video frames occurs. This is advantageous to the content provider, as it allows the content provider to better direct target content to users based on what the user is currently viewing.

In one embodiment, a fingerprint of portions of the video content being monitored is generated. For instance, different sets of video frames may be fingerprinted in a similar way as the set of video frames to be targeted by the content provider. It can then be determined that one of the fingerprints of the video content corresponds to or matches a fingerprint generated from the targeted set of video frames.

Once a match is found, the corresponding target content can be communicated to the user's computing device for presentation. The presentation of the target content may be in the form of an overlay over the video, in-stream of the video, or even on a different computing device associated with the user.

The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. One or more computer storage media storing computer-useable instructions that, when used by one or more computing devices, cause the one or more computing devices to perform a method for providing target content based on one or more selected video frames, the method comprising:
    prior to monitoring other video content to detect playback of a specific set of video frames, receiving a selection of the specific set of video frames from a content provider;
    receiving the target content from the content provider to be presented upon detection of a playback of the specific set of video frames;
    monitoring the other video content to detect the playback of the specific set of video frames received from the content provider, the other video content comprising the specific set of video frames within the other video content;
    detecting the playback of the specific set of video frames received from the content provider within the other video content; and
    in response to detecting the playback of the specific set of video frames, communicating for presentation the target content.

2. The one or more computer storage media of claim 1, further comprising storing the specific set of video frames in association with the received target content.

3. The one or more computer storage media of claim 1, wherein the other video content is displayed on a same computing device as that which displays the playback of the specific set of video frames.

4. The one or more computer storage media of claim 1, further comprising:
    generating a fingerprint of the specific set of video frames, the fingerprint uniquely identifying the specific set of video frames;
    storing the fingerprint of the specific set of video frames for future reference to determine that the playback of the specific set of video frames matches the stored specific set of video frames; and
    generating one or more fingerprints of the other video content.

5. The one or more computer storage media of claim 4, further comprising detecting the playback of the specific set of video frames by determining that the fingerprint of the specific set of video frames matches one of the one or more fingerprints of the other video content.

6. The one or more computer storage media of claim 1, wherein the target content is presented as an overlay on the other video content.

7. The one or more computer storage media of claim 1, wherein the target content is inserted into a stream of the other video content.

8. The one or more computer storage media of claim 1, wherein the target content is an advertisement provided by a third-party advertisement provider.

9. The one or more computer storage media of claim 1, wherein the specific set of video frames and the target content are submitted by a third-party target content provider.

10. The one or more computer storage media of claim 1, wherein the target content is relevant to the specific set of video frames.

11. A method being performed by one or more computing devices having at least one processor, the method for providing target content based on video frames, the method comprising:
    monitoring video content that is displayed on a computing device associated with a user;
    generating fingerprints of one or more video frames of the video content being monitored, wherein the fingerprints uniquely identify the one or more video frames;
    comparing the fingerprints of the one or more video frames of the video content being monitored to a previously-stored fingerprint, wherein the previously-stored fingerprint uniquely identifies a targeted sequence of video frames received from a third-party content provider;
    detecting playback of the targeted sequence of video frames within the video content based on a match between a fingerprint of the one or more video frames of the video content being monitored and the previously-stored fingerprint, wherein the targeted sequence of video frames is determined to be targeted by the third-party content provider in relation to content provided by the third-party content provider;
    retrieving from storage the content associated with the targeted sequence of video frames; and
    communicating for presentation the content that is to be presented to the user based on playback of the targeted sequence of video frames.

12. The method of claim 11, wherein the content is communicated to the computing device associated with the display of the video content.

13. The method of claim 11, wherein the content is communicated to a secondary computing device associated with the user.

14. The method of claim 11, wherein the targeted sequence of video frames targeted by the third-party content provider is not based on a timing of the playback of the targeted sequence of video frames within the video content.

15. The method of claim 11, wherein the content is presented on the computing device as an overlay of the video content.

16. The method of claim 11, wherein the targeted sequence of video frames within the video content is determined as being targeted irrespective of when in the video content the playback of the targeted sequence of video frames occurs.

17. A system comprising:
    at least one processor; and a computer storage memory having computer-executable instructions stored thereon which, when executed by the at least one processor, configure the computing device to:

receive from a third-party target content provider a video segment, comprising a sequence of video frames, and target content to be presented to a user based on detection of a playback of the video segment within other video content, wherein the sequence of video frames is a video clip of interest to the third-party target content provider based on the target content;

monitor the other video content being presented to the user to determine that the sequence of video frames is included in the other video content; and responsive to a determination that the sequence of video frames occurs during the presentation of the other video content, communicate for presentation the target content associated with the sequence of video frames.

18. The system of claim 17, wherein the targeted sequence of video frames within the video content is identified as being targeted irrespective of when in the video content the playback of the targeted sequence of video frames occurs.

\* \* \* \* \*